United States Patent
Oswald et al.

(10) Patent No.: US 10,099,714 B2
(45) Date of Patent: Oct. 16, 2018

(54) FRONT-MOUNTED STAND-ON LAWN CARE VEHICLE

(71) Applicant: HUSQVARNA AB, Huskvarna (SE)

(72) Inventors: Kevin Oswald, Columbus, IN (US); Sean Dwyer, Gastonia, NC (US); Leanne Cushing, Somerville, MA (US); Michael Adams, Signal Mountain, TN (US); Braxton Reese, Charlotte, NC (US); Richard D. Bednar, Huntersville, NC (US); James Flynn, Gastonia, NC (US); Jerry Sandy, Fort Mill, SC (US); Thomas Limpo, Fort Mill, SC (US); Steve Brinkman, Martinez, GA (US); Krzysztof Glomski, Springfield, SC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/204,218

(22) Filed: Jul. 7, 2016

(65) Prior Publication Data

US 2016/0311458 A1 Oct. 27, 2016

Related U.S. Application Data

(63) Continuation of application No. 14/468,907, filed on Aug. 26, 2014, now Pat. No. 9,409,589, which is a (Continued)

(51) Int. Cl.
*B62D 7/06* (2006.01)
*B62D 1/16* (2006.01)
(Continued)

(52) U.S. Cl.
CPC ............. *B62D 1/12* (2013.01); *A01D 34/001* (2013.01); *A01D 34/006* (2013.01); *A01D 34/66* (2013.01);
(Continued)

(58) Field of Classification Search
CPC ... B62D 1/00; B62D 1/02; B62D 1/04; B62D 1/12; B62D 51/02; A01D 34/00; A01D 34/001; A01D 34/006
See application file for complete search history.

(56) References Cited

U.S. PATENT DOCUMENTS

| 4,878,339 A | 11/1989 | Marier et al. |
| RE34,921 E | 5/1995 | Lamusga et al. |

(Continued)

FOREIGN PATENT DOCUMENTS

| CN | 2650481 Y | 10/2004 |
| CN | 101559727 A | 10/2009 |

OTHER PUBLICATIONS

International Search Report and Written Opinion for International Application No. PCT/US2012/047613 dated Oct. 5, 2012.
(Continued)

*Primary Examiner* — Tony H Winner
(74) *Attorney, Agent, or Firm* — McNair Law Firm, P.A.

(57) ABSTRACT

A riding lawn care vehicle may include: (a) a frame to which a pair of front wheels and a rear wheel assembly of the riding lawn care vehicle are attachable; (b) an engine mounted to the frame substantially between the front wheels; (c) a steering assembly having steering levers operably coupled to respective ones of the front wheels of the riding lawn care vehicle via respective hydrostatic drive pumps driven by the engine; (d) a support platform coupled to the frame rearward of the engine to support a standing rider; and (e) a front mount assembly configured to detachably couple the riding
(Continued)

lawn care vehicle to an attachment that enables performance of a yard maintenance activity, where (f) a majority of the support platform is disposed rearward of an axis of rotation of the front wheels and forward of an axis of rotation of the rear wheel assembly.

20 Claims, 13 Drawing Sheets

Related U.S. Application Data continuation of application No. 14/232,924, filed as application No. PCT/US2012/047613 on Jul. 20, 2012, now Pat. No. 8,887,841.

(60) Provisional application No. 61/511,345, filed on Jul. 25, 2011.

(51) Int. Cl.

| | |
|---|---|
| *B62D 1/12* | (2006.01) |
| *A01D 34/00* | (2006.01) |
| *A01D 34/82* | (2006.01) |
| *A01D 42/00* | (2006.01) |
| *A01D 42/04* | (2006.01) |
| *B62D 11/04* | (2006.01) |
| *B62D 51/02* | (2006.01) |
| *B62D 61/06* | (2006.01) |
| *B60K 17/28* | (2006.01) |
| *B62D 11/06* | (2006.01) |
| *A01D 34/66* | (2006.01) |
| *A01D 101/00* | (2006.01) |

(52) U.S. Cl.
CPC ........... *A01D 34/82* (2013.01); *A01D 34/824* (2013.01); *A01D 42/00* (2013.01); *A01D 42/04* (2013.01); *B60K 17/28* (2013.01); *B62D 11/04* (2013.01); *B62D 11/06* (2013.01); *B62D 51/02* (2013.01); *B62D 61/065* (2013.01); *A01D 2101/00* (2013.01)

(56) References Cited

U.S. PATENT DOCUMENTS

| | | | |
|---|---|---|---|
| 5,809,755 A * | 9/1998 | Velke | .............. A01D 34/001 |
| | | | 180/19.3 |
| 5,909,887 A | 6/1999 | Hobrath | |
| 5,947,505 A | 9/1999 | Martin | |
| 6,082,083 A | 7/2000 | Stalpes et al. | |
| 6,145,855 A | 11/2000 | Bellis, Jr. | |
| 6,341,480 B1 | 1/2002 | Dahl et al. | |
| 6,497,422 B1 | 12/2002 | Bellis, Jr. | |
| 6,688,090 B2 | 2/2004 | Velke et al. | |
| 6,862,872 B2 | 3/2005 | Wright et al. | |
| 7,146,787 B2 | 12/2006 | Walker | |
| 7,467,677 B2 * | 12/2008 | Barrier | ............... A01D 34/824 |
| | | | 180/6.32 |
| 7,481,036 B2 | 1/2009 | Lilliestielke et al. | |
| 8,141,886 B1 * | 3/2012 | Sugden | ............... A01D 34/82 |
| | | | 280/291 |
| 8,234,748 B2 | 8/2012 | Mayer | |
| 8,371,404 B2 | 2/2013 | Boeckler | |
| 8,454,032 B2 | 6/2013 | Havener | |
| 8,887,841 B2 | 11/2014 | Oswald et al. | |
| 9,021,776 B2 * | 5/2015 | Zwieg | ............... A01D 34/64 |
| | | | 56/17.1 |
| 2002/0171212 A1 | 11/2002 | Bricko | |
| 2004/0031629 A1 | 2/2004 | Walker | |
| 2004/0145134 A1 | 7/2004 | Bares | |
| 2005/0183409 A1 | 8/2005 | Barrier | |
| 2006/0010846 A1 | 1/2006 | Koehn | |
| 2009/0096178 A1 | 4/2009 | Beal | |
| 2009/0182470 A1 | 7/2009 | Garvey et al. | |
| 2009/0260901 A1 | 10/2009 | Ishii et al. | |
| 2009/0302562 A1 | 12/2009 | Kallevig et al. | |
| 2010/0126792 A1 * | 5/2010 | Kallevig | ............... B60K 26/00 |
| | | | 180/315 |
| 2011/0278088 A1 * | 11/2011 | Weihl | ............... B62D 1/02 |
| | | | 180/400 |
| 2012/0211951 A1 | 8/2012 | Montplaisir et al. | |

OTHER PUBLICATIONS

International Preliminary Report on Patentability for International Application No. PCT/US2012/047613 dated Jan. 28, 2014.

* cited by examiner

FRONT-MOUNTED STAND-ON LAWN CARE VEHICLE

CROSS-REFERENCE TO RELATED APPLICATIONS

This application is a continuation of U.S. application Ser. No. 14/468,907 filed Aug. 26, 2014, which is a continuation of U.S. application Ser. No. 14/232,924 filed on Jan. 15, 2014 (now patented as U.S. Pat. No. 8,887,841), which is a national phase entry of PCT/US2012/047613 filed Jul. 20, 2012, which claims priority to U.S. 61/511,345 filed Jul. 25, 2011 the entire contents of each of which are hereby incorporated herein by reference.

TECHNICAL FIELD

Example embodiments generally relate to lawn care vehicles and, more particularly, relate to a new type of versatile, front-mounted vehicle configured for performing lawn maintenance responsive to control of an operator standing thereon.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle.

Riding lawn care vehicles typically include steering assemblies that are used to direct the movement of the riding lawn care vehicles. The steering assemblies often take the familiar form of a steering wheel. However, handlebar assemblies have also been used in some cases. More recently, some mowers with very sharp turning capabilities have employed separate steering levers or even a joystick to provide steering functionality. These relatively sharp turning models have become increasingly popular. One particular type of sharp turning mower is a stand on model that is designed to support a standing operator rather than (or perhaps as an optional alternative to) a seated rider. Stand on models may be useful or desirable in some contexts or by some operators and thus, continued improvements in the design and operation of these models is needed.

BRIEF SUMMARY OF SOME EXAMPLES

Accordingly, some example embodiments may provide a structure for employment in connection with a stand on riding lawn care vehicle. For example, in one embodiment of the invention, a new type of sharp turning lawn care vehicle is provided where the operator stands upon a platform during operation of the lawn care vehicle, and where the platform is attached to vehicle's frame in the area between the axis of a pair of front drive wheels and the axis of one or more rear caster-type wheels. Moreover, in some embodiments, the stand on lawn care vehicle includes a front mount assembly that may enable the operator to employ multiple attachments at the front of the lawn care vehicle. As such, some embodiments may provide a relatively sharp turn radius riding lawn care vehicle that employs a platform for an operator to stand upon while operating the riding lawn care vehicle and permits the use of a plurality of different attachments in a front-mounted arrangement.

In one example embodiment, a riding lawn care vehicle is provided. The riding lawn care vehicle may include a frame, an engine, a steering assembly, a support platform, and a front mount assembly. The frame may be attachable to a pair of front wheels and a rear wheel assembly of the riding lawn care vehicle. The engine may be mounted to the frame substantially between the front wheels. The steering assembly may include steering levers operably coupled to respective ones of the front wheels of the riding lawn care vehicle via respective hydrostatic drive pumps driven by the engine. The steering assembly may enable steering of the riding lawn care vehicle based on drive speed control of the front wheels responsive to positioning of steering levers of the steering assembly. The support platform may be coupled to the frame rearward of the engine to support a standing rider. The front mount assembly may be configured to detachably couple the riding lawn care vehicle to an attachment that enables performance of a yard maintenance activity. Further, a majority of the support platform may be disposed rearward of an axis of rotation of the front wheels and forward of an axis of rotation of the rear wheel assembly.

Some example embodiments may improve an operator's ability to employ a stand on model of a lawn care vehicle to accomplish various yard maintenance activities. The user experience associated with achieving a comfortable ride on a riding lawn care vehicle may also be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
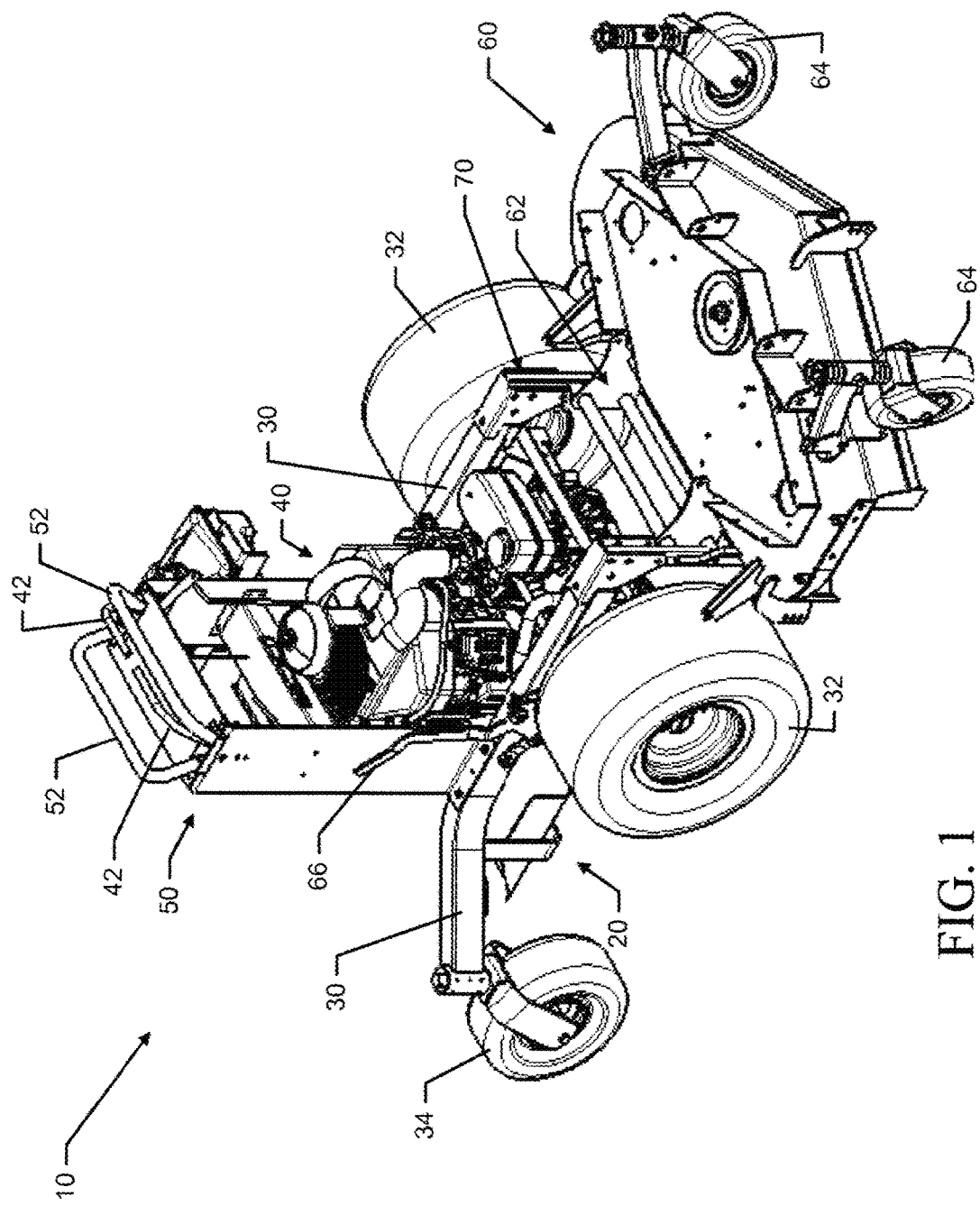
FIG. 1 illustrates a perspective view of a riding lawn care vehicle having a multi-purpose, front mount assembly mounting a cutting deck according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

Some example embodiments may improve operator comfort and overall device utility of lawn care vehicles such as, for example, riding lawn mowers with a stand on platform. In this regard, some example embodiments may provide a multi-purpose, front mounted arrangement for a stand on, riding lawn care vehicle. Such an arrangement may provide improved serviceability and utility in a more compact size than models that accommodate a seated operator. Storage and shipment space required for such models may therefore be reduced relative to models that accommodate a seated operator. Furthermore, such an arrangement may provide for a stand on lawn care vehicle with improved handling, control, serviceability, and/or utility relative to conventional stand on mowers.

Figure 2:
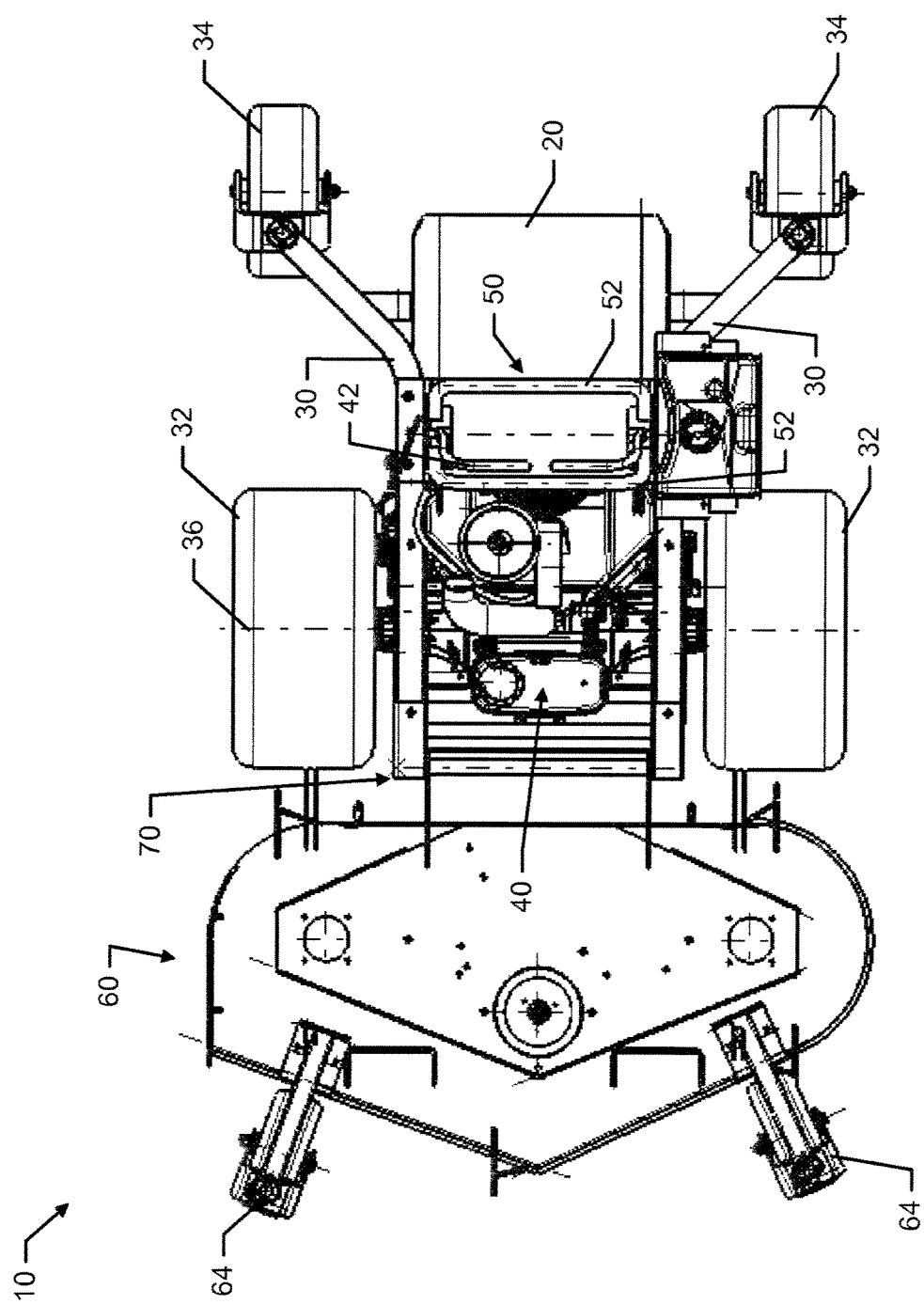
FIG. 2 illustrates a top view of the riding lawn care vehicle of FIG. 1 according to an example embodiment.
Figure 3:
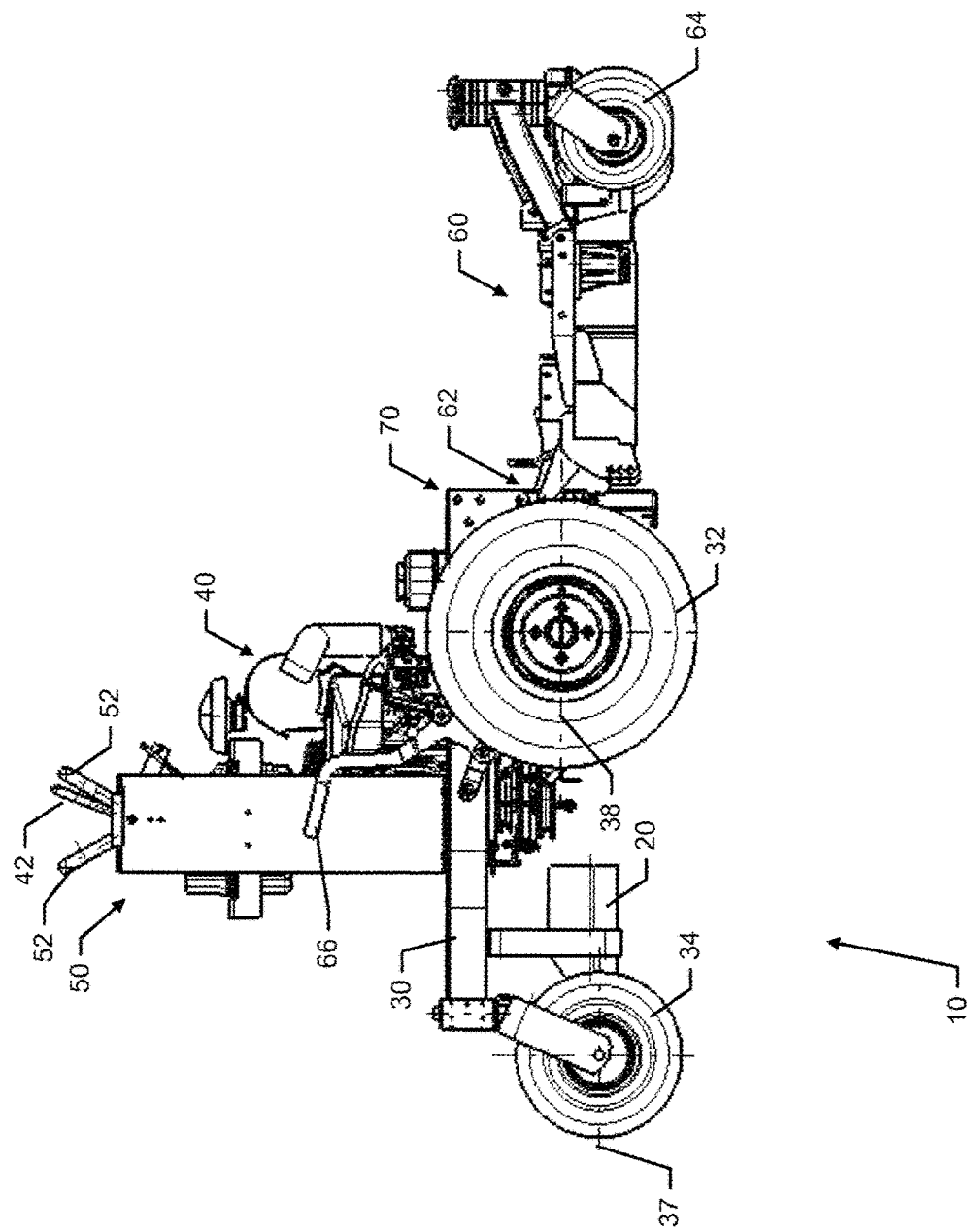
FIG. 3 illustrates a side view of the riding lawn care vehicle of FIG. 1 according to an example embodiment.

FIG. 1 illustrates a perspective view of a riding lawn care vehicle 10 having a multi-purpose, front mount assembly according to an example embodiment. FIG. 2 illustrates a top view of the riding lawn care vehicle 10. FIG. 3 illustrates a side view of the riding lawn care vehicle 10 according to an example embodiment.

Referring to FIGS. 1-3, the riding lawn care vehicle 10 of FIG. 1 includes a support platform 20 attached to a frame 30 of the riding lawn care vehicle 10. The support platform 20 may be configured to support a standing rider that may operate the riding lawn care vehicle 10. As such, the support platform 20 may include a step-like, substantially flat surface upon which the operator may stand. To be able to accommodate riders of various sizes while minimizing overall weight, the support platform 20 may be made of relatively thin sheet metal or another rigid material that is sized to substantially support one or more feet of an average expected operator of the riding lawn care vehicle 10. The support platform 20 may be cushioned or have a suspension system to improve operator comfort.

In the illustrated embodiment, the support platform 20 is a permanent feature of the riding lawn care vehicle and is fixed relative to the frame 30 so that it is not permitted to move relative to the frame 30 during operation. In other embodiments, the support platform 20 may still be a permanent feature of the lawn care vehicle, but may be permitted to move relative to the frame in one or more planes of motion. For example, the support platform 20 may be mounted to the frame 30 so that it is prevented from moving side to side relative to the frame 30, but at the same time the support platform 20 may be rotatably mounted to the frame 30 so that, during operation, the support platform 20 stays substantially horizontal (at least within some defined range of motion) despite changes in the grade of the surface over which the lawn care vehicle is traveling. Such a design may make it easier for the operator to remain on the platform 20 when the lawn care vehicle 10 is traveling up or down a hill or traversing a hill sideways.

The frame 30 may be a weldment or assembly of frame members that may lie substantially in a same plane (as shown in FIG. 3). The plane in which the frame 30 lies may be substantially parallel to the ground upon which the riding lawn care vehicle 10 is operated when the riding lawn care vehicle 10 is operated on even terrain. In an example embodiment, the frame 30 may include at least two elongate members that extend substantially parallel to a longitudinal length of the riding lawn care vehicle 10. The frame 30 may further include cross members, brackets, and/or other support structures as needed or desired to provide a solid foundation for attachment of other components of the riding lawn care vehicle 10.

In an example embodiment, the frame 30 may support (directly or indirectly) ground contacting wheels of the riding lawn care vehicle 10. In this regard, the riding lawn care vehicle 10 may include a pair of front wheels 32 and a pair of rear wheels 34. In the illustrated embodiment, the front wheels 32 are also the "drive wheels" since they are powered to provide the driving force for propelling the lawn care vehicle 20 over the ground. In the illustrated embodiment, the rear wheels 34 are not drive wheels (i.e., are not powered to propel the lawn care vehicle) and may be caster or caster-type wheels. The front wheels may be capable of being independently driven so that the lawn care vehicle 10 can turn and perform sharp turning maneuvers by driving the front wheels 32 at different speeds or in different directions.

In some embodiments, the front wheels 32 may have a larger diameter than the rear wheels 34. As such, an axis of rotation of the front wheels 32 may have a higher elevation (e.g., vertical distance from the ground) than the elevation of the axis of rotation of the rear wheels 34.

As illustrated, the front wheels 32 are forward of the rear wheels 34. However, it should be appreciated that the front wheels 32 are not necessarily the forward-most wheels and the rear wheels 34 are not necessarily the rear-most wheels. In the exemplary embodiment illustrated in FIGS. 1-3, the rear wheels 34 are the rear-most wheels and the front wheels 32 are the forward-most wheels when the cutting deck assembly 60 (or other front-mounted attachment) is removed. However, as illustrated in FIGS. 1-3, some front-mounted attachments, such as the cutting deck assembly 60, may have one or more wheels 64 that are forward of the front wheels 32 when attached to the lawn care vehicle 10 and in an operating position.

The riding lawn care vehicle 10 may include an engine 40. The engine 40 may be a gas-powered combustion engine, as shown in FIGS. 1-3, or may be another type of engine, such as a battery-powered electric motor. The engine 40 may be supported by the frame 30 via an engine deck, which may include a platform, support brackets, support rods, and/or the like upon which the engine 40 may be disposed. Support for the engine 40 may be provided such that the engine 40 is disposed substantially between the front wheels 32. However, as shown in FIGS. 1-3, some portions of the engine 40 may extend forward or rearward of the front wheels 32. In some embodiments, a bottom of the engine 40 may be supported to sit at least at an elevation above the ground that is equal to or higher than the axis of rotation of the front wheels 32. In other words, in some embodiments the engine deck is at an elevation equal to or higher than the axis of the front wheels 32. In the illustrated embodiment, the engine deck is located between the elevation of the axis of the front wheels 32 and the elevation of the top edge of the front wheels 32.

The engine 40 may drive (e.g., via belts, chains, cables, pulleys, shafts, etc.) the cutting deck or other front attachment. The engine 40 may be configured to have a horizontal or a vertical crankshaft. A horizontal crankshaft may be advantageous in some embodiments since it may lend itself better to driving the cutting deck or other front attachment using a shaft. A vertical crankshaft may be advantageous in some embodiments since it may lend itself better to driving the cutting deck or other front attachment using a belt, chain, or other endless band.

In an example embodiment, the engine 40 may drive (e.g., via belts, chains, cables, pulleys, shafts, etc.) hydrostatic pumps that are functionally connected to steering levers (e.g., control levers 42) that may be disposed at an operating station 50 of the riding lawn care vehicle 10 to form a steering assembly for the riding lawn care vehicle 10. One of the hydrostatic pumps may be provided for each wheel (e.g., each one of the front wheels 32) to provide inputs to the drive wheels for driving the wheels in forward or reverse and controlling the speed of the corresponding wheel responsive to a position of the control levers 42. As such, the operator may stand on the support platform 20 facing the engine 40 and be positioned to operate the control levers 42 at the operating station 50 to control the movement of the riding lawn care vehicle 10 based on the combined inputs provided to the control levers 42. For example, if both levers are engaged in a forward direction by the same amount, the riding lawn care vehicle 10 may move substantially straight ahead at a speed determined by the degree of deflection of the control levers 42 provided by the engagement. Meanwhile, if both levers are engaged in a reverse direction by the same amount, the riding lawn care vehicle 10 may move substantially straight back at a speed determined by the degree of deflection of the control levers 42 provided by the engagement. If one lever is engaged in a forward direction with a same degree of deflection as the other lever is engaged in the reverse direction, then the riding lawn care vehicle 10 may be directed to make a substantially zero or otherwise minimal radius turn. Any difference in the degree of deflection between the control levers 42 may then result in turns of varying magnitudes, the size of which depend upon the difference in the degree of deflection.

When performing a substantially zero or otherwise minimal radius turn (where the two front wheels 32 are driven at equal speeds in opposite directions), an axis of rotation of the riding lawn care vehicle 10 may extend substantially perpendicular to the plane of the frame 30 and/or the plane of the ground from a location substantially half way between the front wheels 34. As such, the axis of rotation of the riding lawn care vehicle 10 may extend perpendicularly (and vertically relative to the horizontal ground plane) from a line (e.g., dashed line 36 in FIG. 2) passing through the axis of rotation of each of the front wheels 32. Furthermore, the axis of rotation of the riding lawn care vehicle 10 may extend from a midway point between the front wheels 32. By positioning the engine 40 substantially between the front wheels 40, a substantial portion of the weight of the riding lawn care vehicle 10 may be placed near the axis of rotation of the riding lawn care vehicle 10 to improve stability. In some cases, to account for differences between the weight of an average operator and the weight of an average attachment (e.g., cutting deck 60) connectable to a front mount assembly 70 of the riding lawn care vehicle 10, the engine 40 may be moved slightly forward or rearward relative to line 36 to attempt to provide a good balance of weight distribution on the riding lawn care vehicle 10, which can affect traction, handling, stability, hill performance, etc. As illustrated in FIGS. 2 and 3, in the illustrated embodiment of the lawn care vehicle 10 much of the engine 40 is positioned rearward of the front wheel axis 36 to help balance the weight of the deck assembly 60 or other front-mount attachment (thereby taking weight off of the deck assembly wheels 64). Further, positioning more of the engine weight rearward of the front wheel axis 36 may provide for a more balanced lawn care vehicle 10 when it is operated without a front-mounted attachment and may prevent the lawn care vehicle 10 from rolling forward over the front wheels 32.

The operating station 50 may be constructed of a U or C shaped assembly that may extend vertically in a direction substantially perpendicular to the plane of the frame 30 (and the support platform 20). The operating station 50 may be made of sheet metal, plastic, composite material or any other suitable rigid material that may form an operating platform from which the control levers 42 may be operated. The height of the operating station 50 relative to the support platform 20 and/or frame 30 may be determined based on an average expected operator's height. In this regard, for example, the operating station 50 may be positioned such that a height thereof may facilitate manual operation of the control levers 42 by a user of average height at a level that lies between chest and waist level for the operator as such a height is likely to provide most users with a comfortable operating experience. In other embodiments, the support platform 20 and/or the operating station 50 may be adjustable vertically so that the operator can, within a predefined range, adjust the distance between the controls levers 42 and the support platform 20 to fit the operator better.

In some embodiments, the operating station 50 tilts forward so that it extends further, for example, over the engine. This may be more comfortable for the operator since the operating station 50 may permit the operator to lean forward against a padded operating station 50. This forward leaning configuration may also allow for better weight distribution, balance, and/or operator stability and may result in more of the operator's mass being located proximate the turn axis. In some embodiments the operating station 50 may be configured to have an adjustable tile so that the operator can adjust the forward tilt, if any, of the operating station 50 within a predefined range of acceptable tile angles.

In some cases, the operating station 50 may extend vertically to at least partially cover portions of the engine 40. However, in other cases, the operating station 50 may be disposed to extend vertically from the frame 30 at a position that is between the engine 40 and the support platform 20. The operating station 50 may include one or more handles 52. These handles 52 may be fixed relative to the frame so that the operator can lean or hang on them to maintain balance when standing on the support platform 20 during operation of the lawn care vehicle 10. If multiple handles are used (as shown in FIGS. 1-3), the control levers 42 may be configured to move in a range defined between the handles 52. The operating station 50 may further include other levers, buttons, and/or displays located in an instrument panel disposed at or near the top of the operating station 50 either forward or aft of the control levers 42.

By extending the operating station 50 substantially over at least a portion of the engine 40, the operator may be at least partially shielded from some of the noise generated by the engine 40. Furthermore, a heat shield may be provided between the engine 40 and the operator (i.e., rearward of the engine 40) so as to protect the operator from the heat and moving components of the engine. The operator side of the heat shield may be cushioned so that the operator can lean against the heat shield during operation of the vehicle 10. In some embodiments, ducting 91 (or an opening generally) extends through or around the operating station 50 from an area proximate the operator's position during operation to the engine's carburetor. Such ducting 91 can draw air for the engine around the operator's station so as to cool the operator during operation of the vehicle 10.

In an example embodiment, the support platform 20 may be suspended or otherwise supported between opposing members of the frame 30 that extend to support the rear wheels 34. As such, for example, the support platform 20 may be positioned such that, relative to a longitudinal length of the riding lawn care vehicle 10 extending from a forward portion to an aft portion thereof, the support platform 20 lies substantially between the axis of rotation of the front wheels 32 and the axis of rotation of the rear wheels 34, as shown in FIG. 2. Furthermore, the support platform 20 may be located completely rearward of the rear edge of the front wheels 32, as also shown in FIGS. 2 and 3. The support platform 20 may stop short of extending beyond the front edge of the rear wheels 34 or, as illustrated in FIGS. 2 and 3, may extend rearward past the front edge of the rear wheels 34 but not beyond the axis of the rear wheels 34. Furthermore, in some embodiments, the support platform 20 lies substantially between the axis of rotation of the rear wheels 34 and an imaginary line parallel to and half way between the axis of rotation of the front wheels 32 and the axis of rotation of the rear wheels 34, as is also shown in FIG. 2. Still further, in some embodiments the support platform 20 may extend rearward of the axis of the rear wheels 34.

In some example embodiments, at least a portion of the support platform 20 may lie between the rear wheels. However, some other example embodiments may provide for positioning of the support platform 20 completely forward of the space between the rear wheels 34. Accordingly, as the example of FIG. 2 illustrates, along the longitudinal centerline of the riding lawn care vehicle 10, the engine 40 may be forward of the operating station 50, and the support platform 20 may be positioned behind the operating station 50. In some embodiments, at least a portion of the support platform 20 may extend beneath the engine deck and/or operating station 50 to allow the front of the operator's feet to extend beneath the engine deck and/or operating station 50.

The support platform 20 may, in some cases, be supported at an elevation that is lower than a bottom of the engine 40 (e.g., lower than the engine deck) and may lie in a plane that is substantially parallel to the ground. As such, for example, the support platform 20 may lie in a plane that is parallel to the plane in which the frame 30 lies, but at an elevation that is lower (e.g., closer to the ground) than the elevation of the plane in which the frame 30 lies.

Furthermore, as illustrated in FIG. 2, the support platform 20 may be disposed at an elevation between the ground and the elevation of the axis of the front wheels 32. As also illustrated in FIG. 2, the support platform 20 may be disposed at an elevation between the ground and the elevation of the axis of the rear wheels 34. In the illustrated embodiment, the bottom of the support platform 20 is slightly below, but proximate to the axis of the rear wheels 34. This location may provide for a low center of gravity and improved stability and operator comfort, while also providing sufficient ground clearance for most types of operation. Such architecture may reduce the amount of vertical extension of the operating station 50 that is required to accommodate comfortable placement of the control levers 42 for an average height operator, thereby maintaining a compact vehicle height.

In other examples, the support platform 20 may be supported at an elevation that is at least as high as the elevation of the axis of rotation of the rear wheels 34. In some cases, the support platform 20 may be supported at an elevation that is between the elevation of the axis of rotation of the rear wheels 34 (indicated by dashed line 37 in FIG. 3) and the elevation of the axis of rotation of the front wheels 32 (indicated by dashed line 38 in FIG. 3). This may also improve visibility for the operator.

As illustrated in FIGS. 1-3, some embodiments of the support platform 20 include a substantially U-shaped platform comprising a horizontal platform upon which the operator stands, and two vertical walls on either side of the horizontal platform. These vertical walls can protect the operator's feet from debris and prevent the operator from allowing his or her feet to touch the front and/or rear wheels.

As indicated above, the front wheels 32 may be hydrostatically controlled as drive wheels for the riding lawn care vehicle 10. However, in some embodiments, drive power could also be provided to the rear wheels 34 either permanently or in certain situations. Otherwise, the rear wheels 34 may simply act as caster wheels that may turn freely when the riding lawn care vehicle 10 moves, but may not be powered. In still other example embodiments, the rear wheels 34 may not be provided as a pair of wheels. For example, three rear wheels or even a single rear wheel could be provided. As such, the rear wheels 34 of FIGS. 1-3 simply illustrate one example of a rear wheel assembly that may include two wheels arranged as a pair. However, other examples of rear wheel assemblies may include more wheels or even a single wheel.

In some embodiments, the rear wheels 34 are caster wheels that can be situationally locked in a particular orientation, such as in a parallel alignment with the front wheels 32. For example, the rear wheels 34 may be locked in their orientation by operator action employing, for example, a hand or foot operated lever, button or other selection device mechanically or electrically coupled to the rear wheels 34 or rear wheel actuators. Lockable rear wheels may be advantageous when performing certain maneuvers, such as when the lawn care vehicle 10 is operating to drive on an incline in a transverse direction such that one of the front wheels 32 is at a higher elevation than the other of the front wheels 32.

In still other embodiments, the rear wheels 34 may be caster-like in that they can, for example, turn approximately 180 or 360 degrees around a vertical axis, but are steerable instead of being able to freely turn about the vertical axis. In such an embodiment, electrical motors or hydraulic actuators 51 may be coupled to the frame 30 at each rear wheel 34 to steer the corresponding rear wheel 34. In such an embodiment, the lawn car vehicle 30 may include a control system (represented by block 53 in the example of FIG. 4) comprised of a computer for coordinating the steering of each rear wheel 34 with the driving of each front wheel 32 based at least in part on the inputs provided to the control levers 42 by the operator. In some such embodiments, the rear wheels 32 may be independently steerable relative to each other.

As illustrated in FIGS. 1-3, a gas tank 45 may be attached to the side of the operating station 50. In another embodiment (not shown) a gas tank may be attached to each side of the operating station 50. In another embodiment, the gas tank may be positioned elsewhere, such as for example, above, to the side of, or in front of the engine 40.

As indicated above, the riding lawn care vehicle 10 may include any of a plurality of different front mounted attachments. To provide a universally applicable mounting apparatus or surface for receiving and/or connecting to such attachments, the riding lawn care vehicle 10 may employ the front mount assembly 70 shown in FIGS. 1-3. The front mount assembly 70 may include a structure disposed at a forward-most position of the riding lawn care vehicle 10 to provide brackets, supports, bars, bolts, detents, detent receivers, slots, grooves and or other components that may enable corresponding components on an attachment to be mated therewith in order to connect the attachment to the riding lawn care vehicle 10. For example, the attachment (e.g., cutting deck 60) may include an attachment frame 62 configured to include bars, brackets, hinges, and/or detents that are attachable to the front mount assembly 70 via corresponding receiving holes and/or slots with or without attachment pins, screws, joints, or nut/bolt combinations.

In some cases, the engine 40 may also power a belt drive, chain drive, friction drive, or other driving mechanism that may be coupled to certain attachments in order to transfer power from the riding lawn care vehicle 10 to the corresponding attachment. As such, the engine 40 may couple to a power transfer assembly (e.g., belt drive, chain drive, friction drive, etc.) to transfer power to an attachment. For example, the cutting deck 60 may include one or more belt or chain driven cutting blades mounted therein. By coupling the engine 40 to a pulley, clutch plate or other driving mechanism on the cutting deck 60 using a belt, chain, series of universal joints, and/or the like, engine power may be used to turn the cutting blades of the cutting deck 60.

In the illustrated embodiment, the cutting deck includes three blades, but a cutting deck with less than or more than three blades is also possible. The cutting deck may be a side discharge, rear discharge, or mulching deck and may be configured so that a grass collection system can selectively be attached thereto. As illustrated in FIG. 2, the cutting deck may extend laterally to and somewhat beyond the front wheels 32 and rear wheels 34 on both sides of the lawn care vehicle 10. This configuration may improve trim performance.

In some cases, the cutting deck 60 may further include caster wheels 64 that may be positioned on the cutting deck 60 (e.g., at a forward portion thereof) to enable the cutting deck 60 to remain substantially level (e.g., parallel to the ground) to provide an even cut during operation. In some embodiments, the caster wheels 64 may be adjustable in their height in order to enable the operator to match an adjustable height of the point of attachment of the cutting deck 60. As such, the operator may be enabled to level the cutting deck 60.

In some cases, an attachment control lever 66 may be provided to facilitate lifting or elevating a portion of the attachment (e.g., elevating the forward end of the cutting deck 60) such that the attachment is held at an angle relative to the ground. Thus, for example, the attachment frame 62 and/or the front mount assembly 70 may include components that enable the attachment (e.g., the cutting deck 60) to be tilted into the air at its forward-most end, but held in contact with the front mount assembly 70 at a rearward-most end of the attachment. In some cases, there may be multiple tilt elevations. For example, in one embodiment, the operator can use lever 66, or another mechanism, to rotate the cutting deck 60 approximately ninety degrees about an attachment point in the attachment frame 62 so that the cutting deck 60 moves from a substantially horizontal position to a substantially vertical position. This can allow for compact storage of the lawn care vehicle 10 in a garage or truck without removal of the cutting deck 60. This configuration may also allow for easier driving when the cutting deck is not in use and can allow the operator to easily replace the cutting blades or perform other cutting deck maintenance tasks where the operator needs to access the underside of the cutting deck 60. In some embodiments, the control lever 66 or other mechanism may also allow the operator to rotate the cutting deck 60 or other font-mount attachment to some lesser extent (e.g., twenty or thirty degrees) about the attachment point to assist with driving the lawn care vehicle over curbs and similar ground features when not performing a cutting operation.

In some other example cases, the attachment control lever 66 or another lever may be used to facilitate height adjustments for the attachment (e.g., for controlling cutting blade height), or facilitate attaching and/or releasing an attachment.

Figure 13:
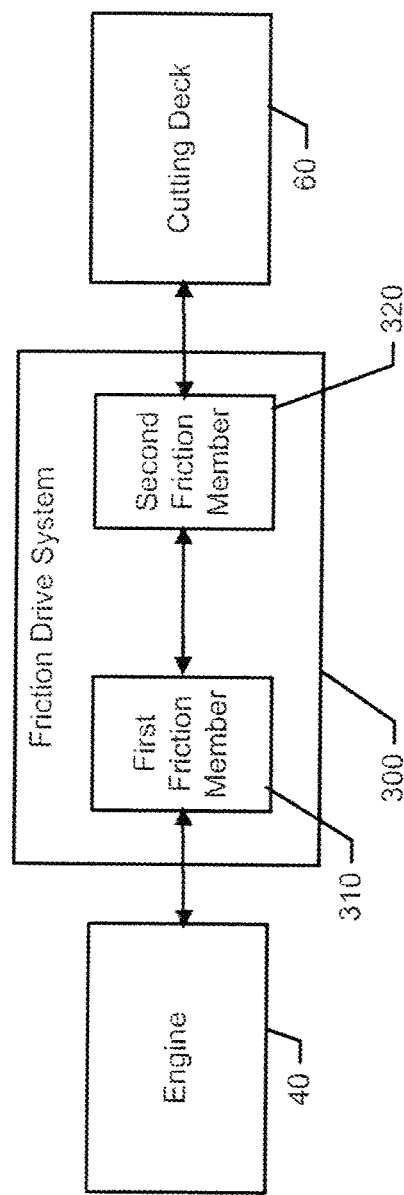
FIG. 13 illustrates a block diagram of a friction drive system according to an example embodiment.

In some embodiments of the invention, the drive system for transferring power from the engine 40, which is mounted to the frame 30, to the front-mounted cutting deck 60 to drive the cutting blades is configured so that the cutting deck 60 can be rotated about the attachment point to a substantially vertical position and then rotated back to an operating position without the operator having to take separate steps to engage and disengage the drive system beyond the step of lifting the cutting deck using the control lever 66 or other mechanism. For example, in one embodiment, the engine 40 uses a drive shaft with two or more universal joints to transfer power from the engine 40 to a cutting blade drive system on the cutting deck 60. The universal joints may be positioned on either side of or proximate to attachment point about which the cutting deck 60 is rotated so that the drive system is not disengaged at the attachment point during lifting of the cutting deck. In another embodiment, a friction drive system 300, as shown in FIG. 13, is used to transfer power from the engine 40 to the cutting deck 60 across the attachment point. One friction member 310 is mounted to the frame 30 and is driven by the engine 40 to rotate about an axis. Another friction member 320 is mounted to cutting deck 60 and is coupled to the cutting deck's cutting blade drive system (e.g., a belt system). When the cutting deck 60 is in the generally horizontal position, the two friction members engage each other and rotation of the first friction member 310 by the engine 40 causes rotation of the second friction member 320 and thereby transfers power from the engine 40 to the cutting deck 60. However, when the cutting deck 60 is lifted beyond a certain point, the friction members are separated thereby disengaging the drive system. When the cutting deck 60 is then lowered again, the drive system is automatically engaged when the two friction members come into contact with each other again.

Figure 4:
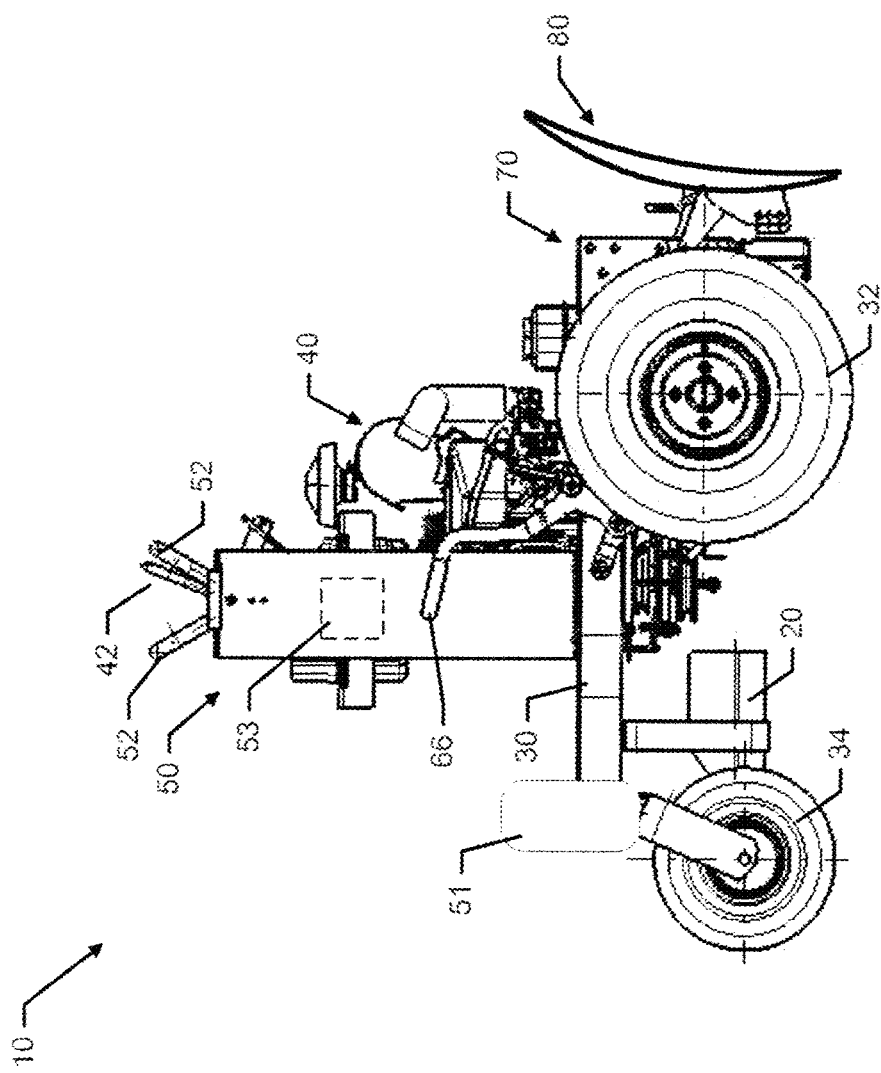
FIG. 4 illustrates a side view of the riding lawn care vehicle having a different attachment, namely a snow plow, mounted to the front mount assembly according to an example embodiment.
Figure 5:
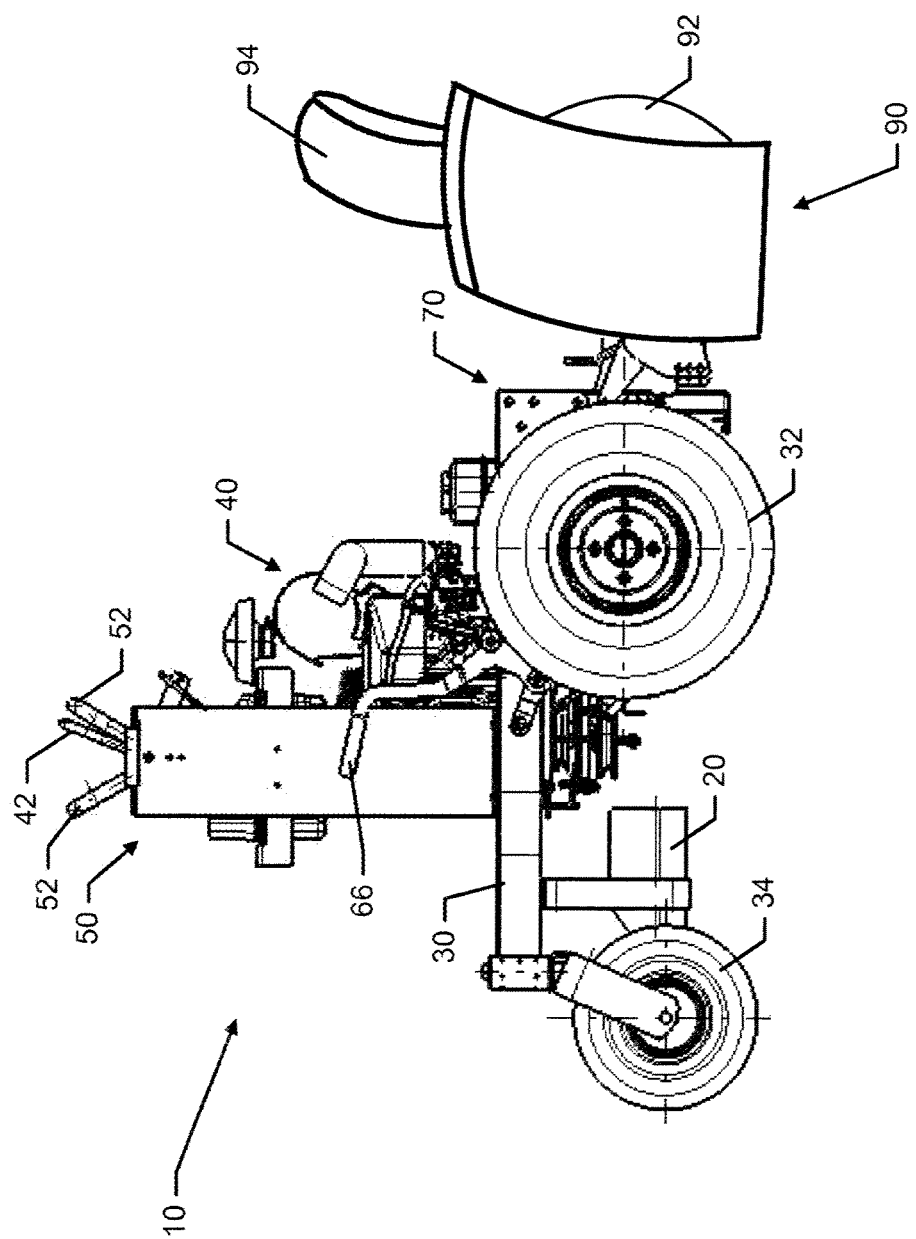
FIG. 5 illustrates a side view of the riding lawn care vehicle having still another example attachment, namely a snow blower, mounted to the front mount assembly according to an example embodiment.
Figure 6:
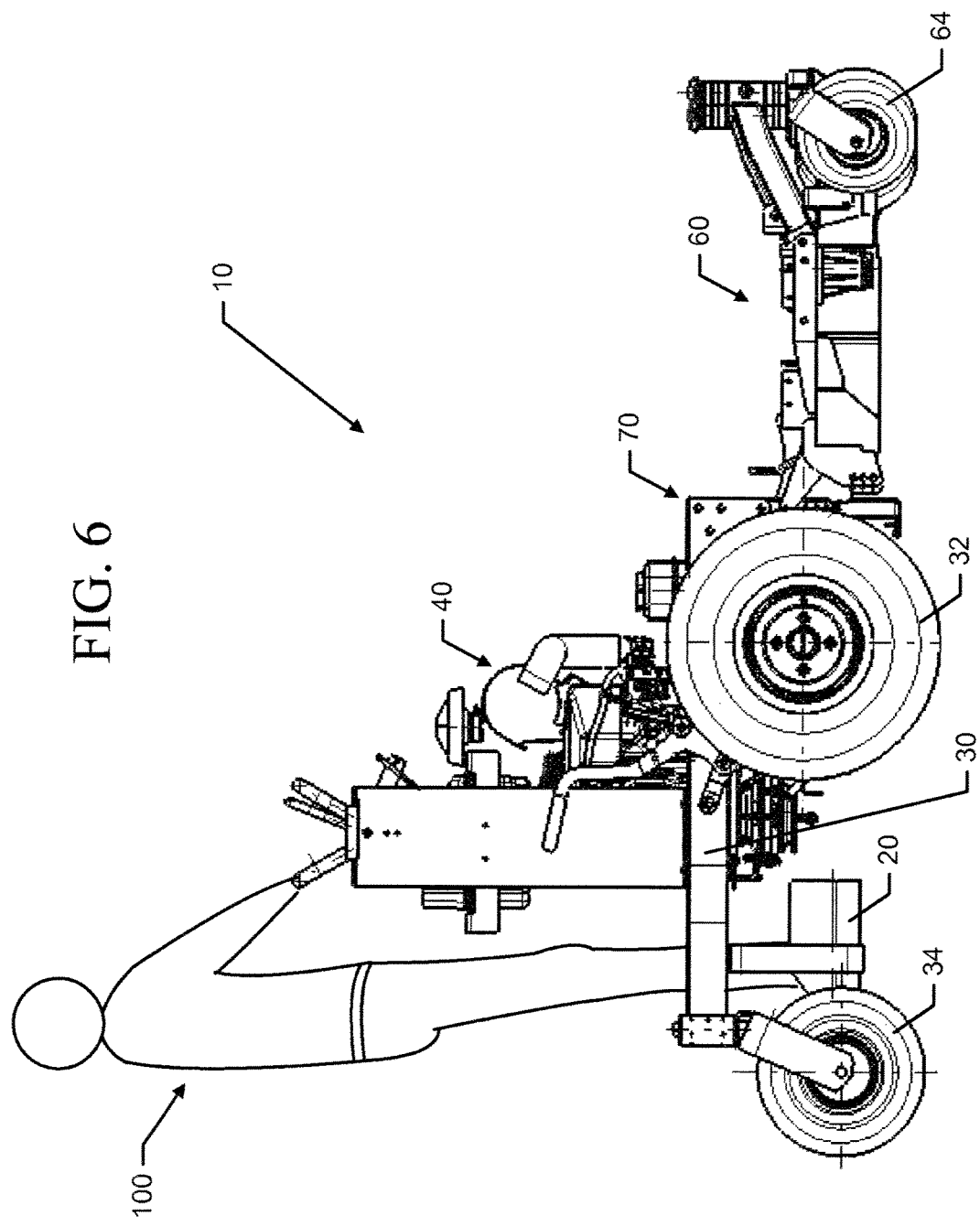
FIG. 6 illustrates a side view of the riding lawn care vehicle of FIG. 3 with an operator riding thereon according to an example embodiment

In some embodiments of the invention, the attachment frame 62 and the drive system are configured so that a variety of front-mount attachments (powered and non-powered) can be selectively attached to the front of the lawn care vehicle 10. FIGS. 1-3 illustrate the riding lawn care vehicle 10 being used in connection with a specific attachment, namely the cutting deck 60. However, numerous other attachments may be employed in various other example embodiments. For example, FIG. 4 illustrates the riding lawn care vehicle 10 accommodating a snow plow attachment 80. Meanwhile, FIG. 5 illustrates the riding lawn care vehicle accommodating a snow blower attachment 90 that may include an auger blade assembly 92 and a discharge chute 94 for ejecting snow responsive to processing of the snow by the auger blade assembly 92. Other alternatives are also possible. For example, attachments for brush cutting, tilling, sweeping, etc., may also be provided in other example embodiments. The attachments (e.g., cutting deck, snowblower, brush, de-thatcher, tiller, etc.) requiring power from the engine 40 may each be configured to engage with the same drive system for to transferring power from the engine 40 to the attachment. FIG. 6 illustrates a side view of the riding lawn care vehicle of FIG. 3 with an operator 100 riding thereon according to an example embodiment.

It should be appreciated that example embodiments of the present invention provide a new type of configuration for a ride-on power head. Embodiments of the invention provide a stand-on vehicle that employs independently driven front wheels located forward of a standing platform and rear caster-type wheels. This new configuration may provide numerous advantages including the ability to attach powered and non-powered tools to the front of the vehicle. Example embodiments of the present invention may therefore be employed to provide a stand on, front mounted, riding lawn care vehicle that may be used for a plurality of different purposes based on the attachment that is made to the front mount assembly of the vehicle. By having a multi-purpose front mount assembly, the riding lawn care vehicle 10 may be used for many more purposes than simply cutting grass. Thus, operators may acquire a single mobile platform of less size and often also less cost than a corresponding riding lawn care vehicle that supports seated riders, and employ the single mobile platform for multiple purposes, just by swapping out attachments rather than buying entirely new dedicated equipment. Furthermore, the single mobile platform may have a substantially zero or otherwise minimal turning radius capabilities. The front mounting configuration with rearward-positioned standing operator and rearward caster wheels may also provide improved accessibility, stability, maneuverability, versatility, handling, hill holding, visibility, cutting performance, trimming performance, and operator escapeability (e.g., operator can simply step off the back of the riding lawn care vehicle 10).

Figure 7:
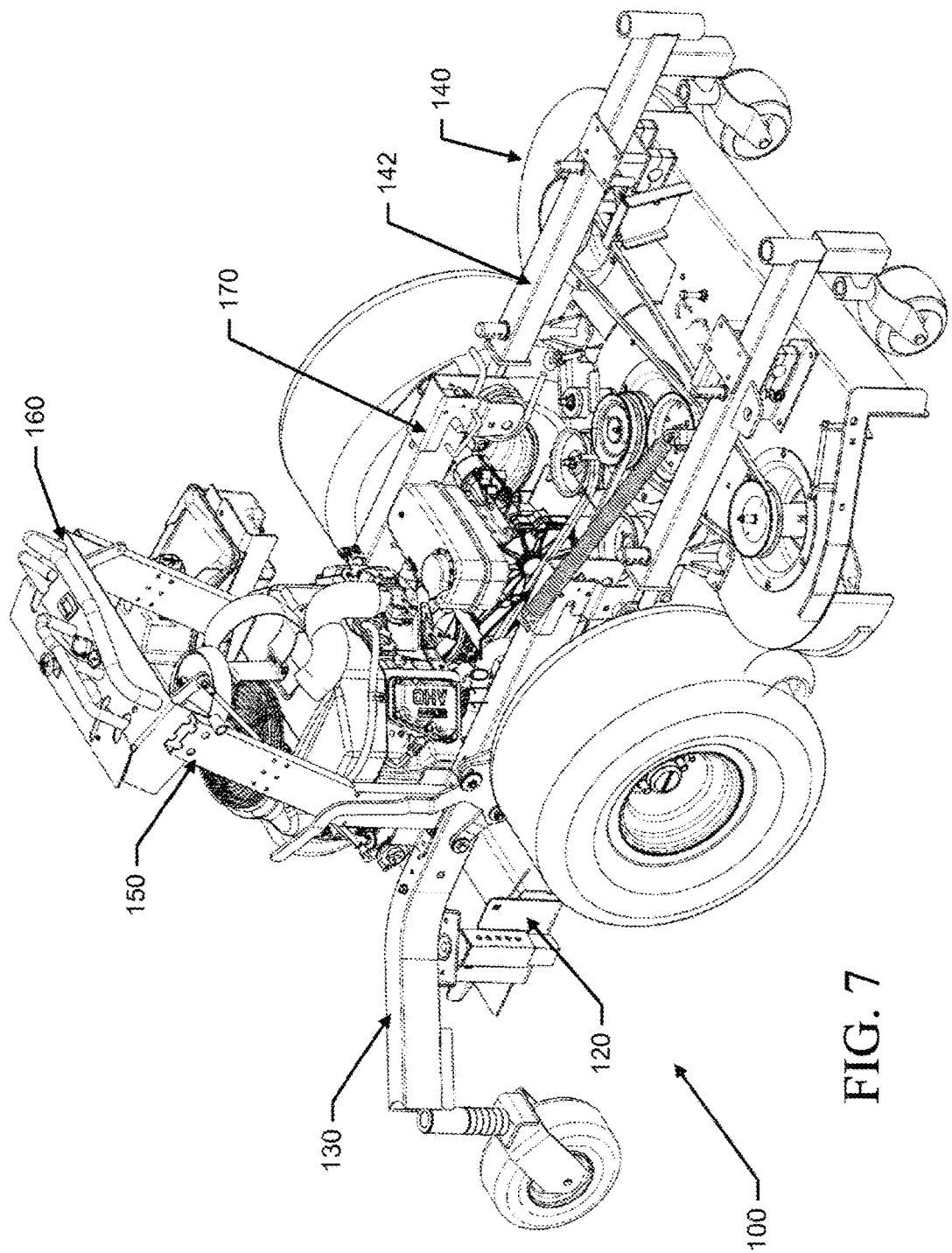
FIG. 7 illustrates a perspective view of a front mounted, stand-on, lawn care vehicle according to an example embodiment.
Figure 8:
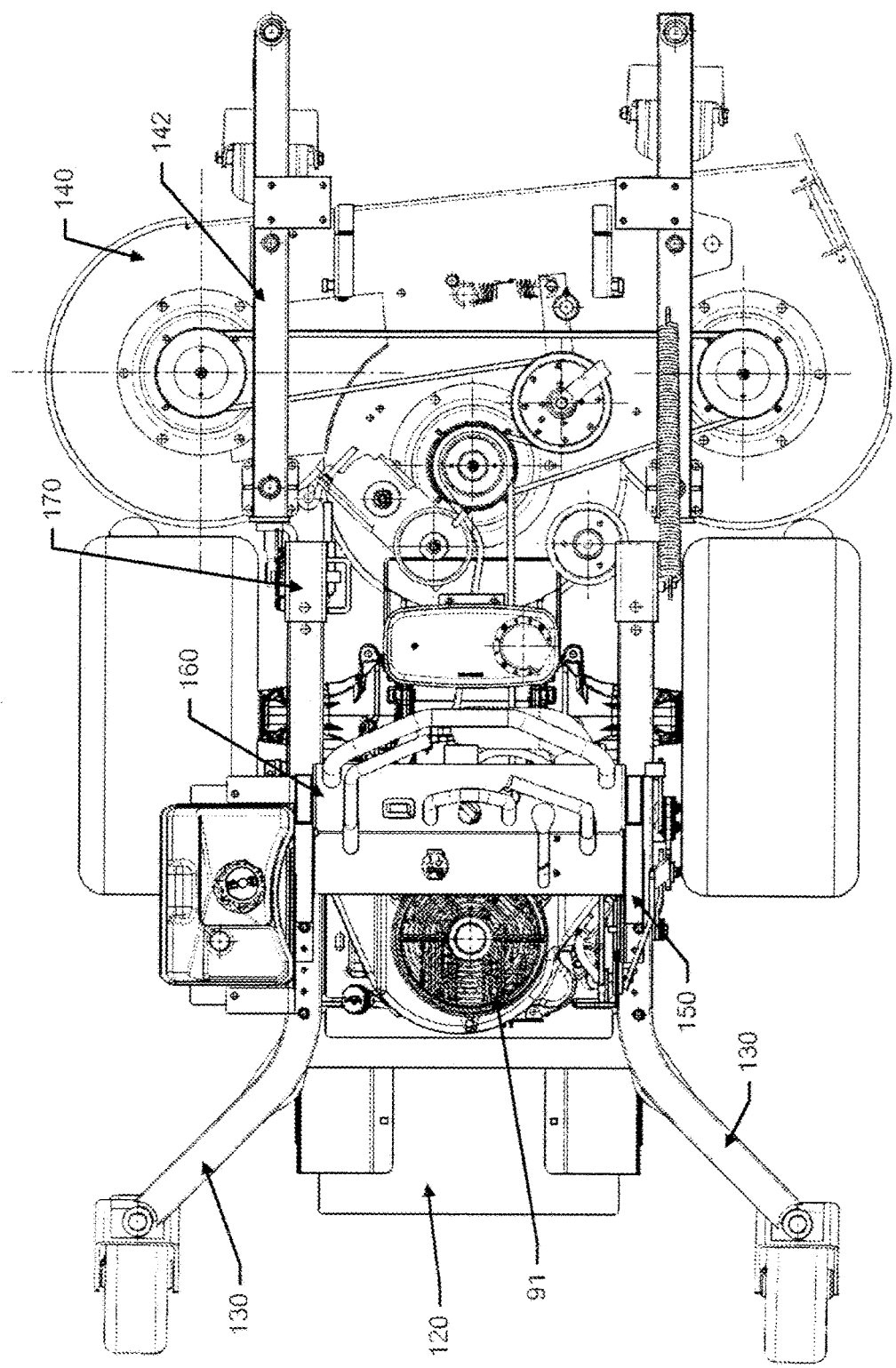
FIG. 8 illustrates a top view of the lawn care vehicle of FIG. 7 according to an example embodiment.
Figure 9:
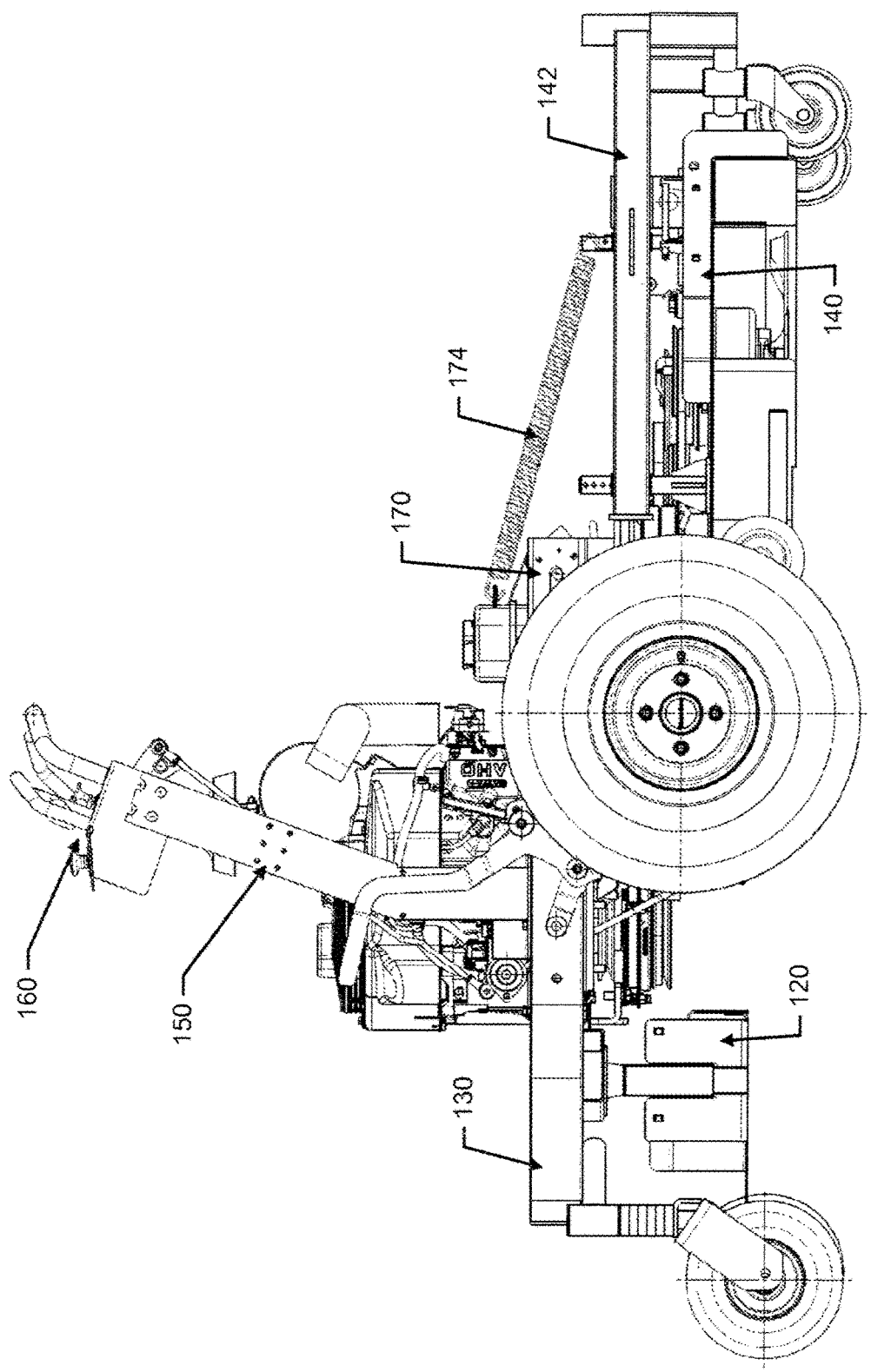
FIG. 9 illustrates a side view of the lawn care vehicle of FIG. 7 according to an example embodiment.
Figure 10:
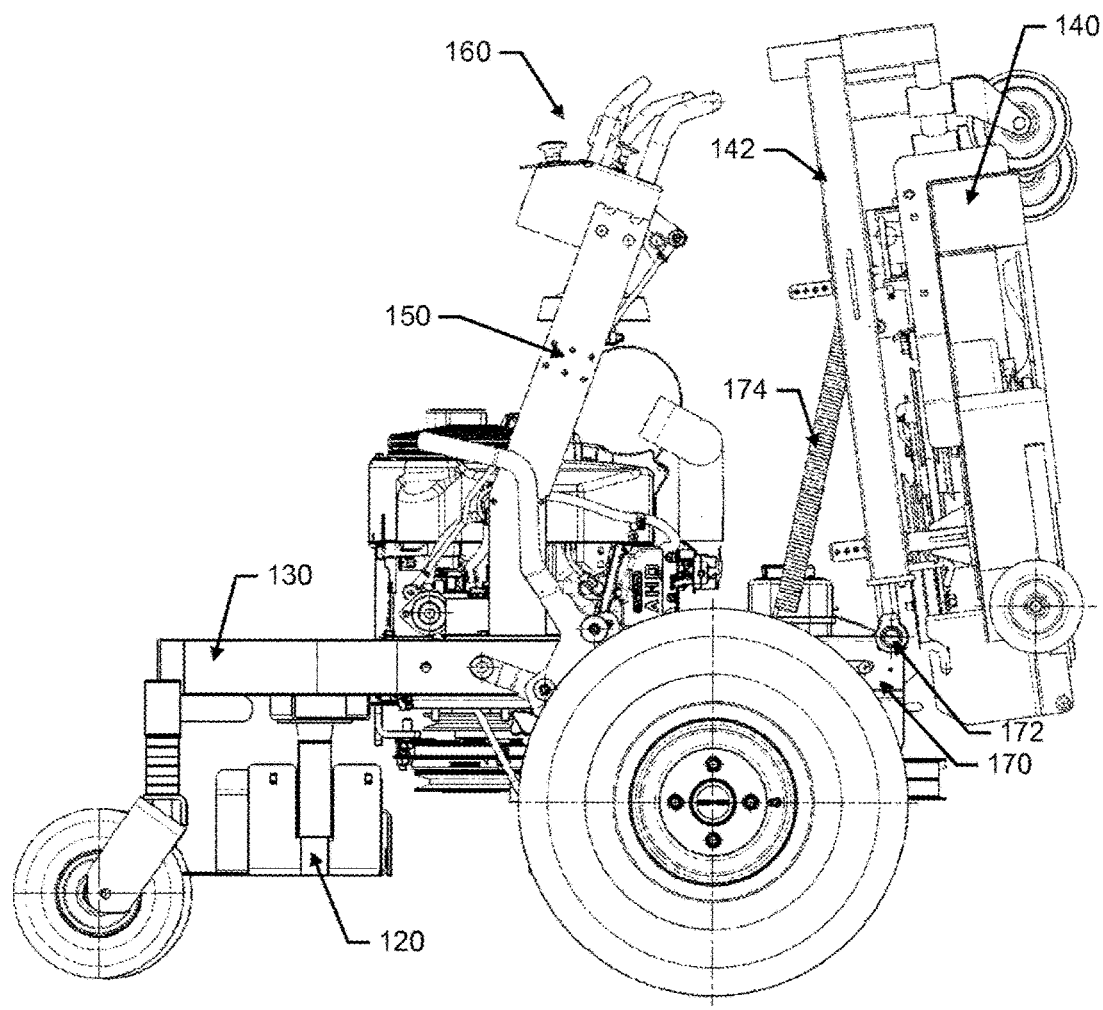
FIG. 10 illustrates a side view of the lawn care vehicle of FIG. 7 in a folded configuration according to an example embodiment.
Figure 11:
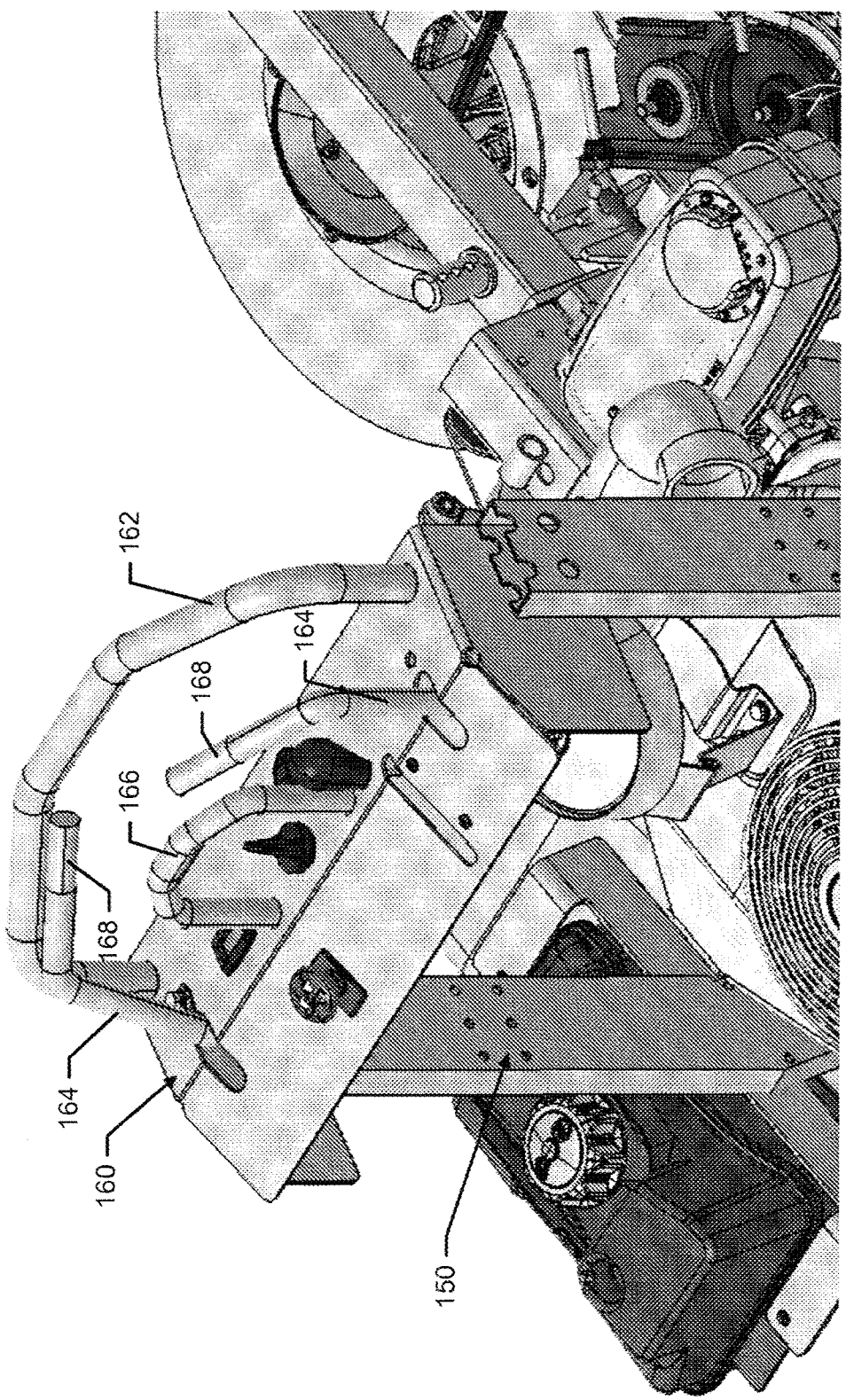
FIG. 11 illustrates a perspective view of the control panel of the lawn care vehicle of an example embodiment.
Figure 12:
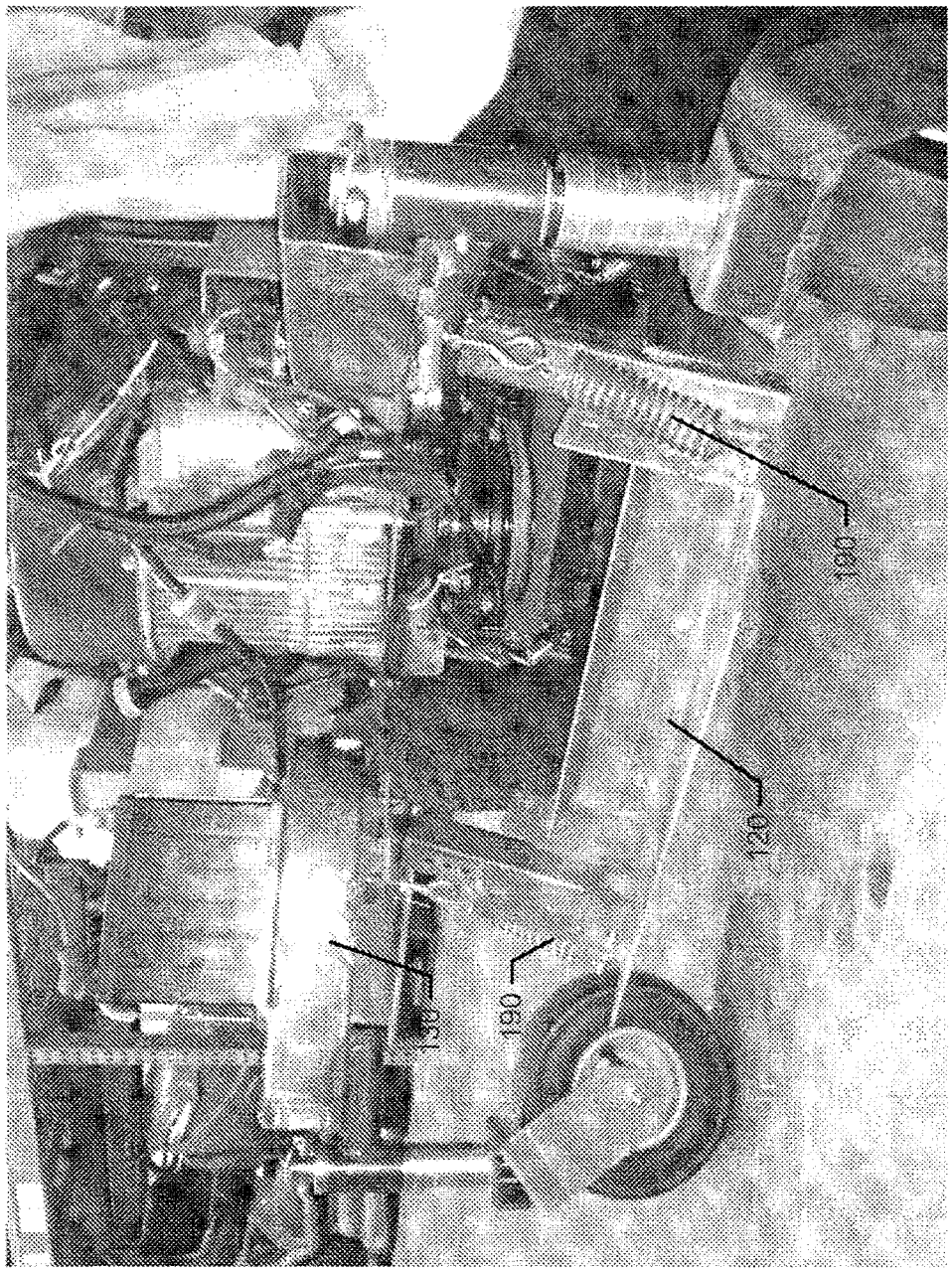
FIG. 12 illustrates a perspective view of a suspension system for a support platform according to an example embodiment.

It should also be appreciated that the examples described above are indicative of some of the inventive concepts associated with corresponding example embodiments, but similar concepts could be employed in different form factors while still falling within the scope of the inventive concepts. In this regard, FIGS. 7-11 illustrate similar concepts in connection with a slightly different form factor. FIG. 7 illustrates a perspective view of a front mounted, stand-on, lawn care vehicle 100 according to an example embodiment. FIG. 8 illustrates a top view of the lawn care vehicle 100 of FIG. 7 according to an example embodiment. FIG. 9 illustrates a side view of the lawn care vehicle 100 of FIG. 7 according to an example embodiment. FIG. 10 illustrates a side view of the lawn care vehicle 100 of FIG. 7 in a folded configuration. FIG. 11 illustrates a perspective view of the control panel of the lawn care vehicle 100 of an example embodiment. FIG. 12 illustrates a perspective view of a suspension system for a support platform according to an example embodiment.

Referring now to FIGS. 7-12, it should be appreciated that the lawn care vehicle 100 may generally have similar components to those described above. For example, the lawn care vehicle 100 may include a support platform 120 attached to a frame 130. In some embodiments, the support platform 120 may be suspended from the frame 130 or otherwise attached thereto via a suspension system 190 that may be configured to absorb at least some shock and provide a smoother ride to the operator. The suspension system 190 may employ dampening springs as shown in FIG. 12.

The wheels of the lawn care vehicle 100 may be similar to those described above in terms of form, function, location, and so on. The lawn care vehicle 100 may also support a cutting deck assembly 140 that may be operably coupled to the engine of the lawn care vehicle to drive one or more cutting blades. However, the lawn care vehicle 100 of FIGS. 7-12 may also include some notable differences with respect to the lawn care vehicle 10 of FIGS. 1-6. In this regard, for example, the lawn care vehicle 100 of FIGS. 7-11 may include the illustrated forward leaning operating station 150, as mentioned above. As indicated above, the forwardly leaning operating station 150 may provide added comfort for users and may assist with weight distribution, operator balance and stability.

In some embodiments, the operating station 150 may also have a different control panel 160 than that of the prior example embodiment. In this regard, for example, the control panel may include a front support bar 162 on which the operator may rest one or more fingers or hands to facilitate support of the operator when control levers 164 are being moved to control their respective wheels as described above. The front support bar 162 may extend substantially transversely across a majority of the width of the control panel 160. Although the front support bar 162 is shown with a slight forwardly progressing bend at a center portion thereof, in some embodiments, the front support bar 162 may extend straight from one side of the control panel 160 toward the opposite side thereof.

The control panel 160 may also include a back support bar 166. The back support bar 166 may be substantially narrower than the front support bar 162, but may still extend in a direction transversely across the control panel 160. In an example embodiment, the back support bar 166 may be less than half of the width of the front support bar 162, or even less than one third of the width of the front support bar 162 in some cases. The back support bar 166 may also be substantially shorter than the front support bar 162. In other words, the back support bar 166 may not extend horizontally above the control panel 160 as high as the front support bar 162.

In some embodiments, the control levers 164 may extend through the control panel 160 from a point that is rearward of the point at which the back support bar 166 extends vertically off of the control panel 160. However, since the control levers 164 may be movable (forward and backward), the control levers 164 may move over a range that extends from a point rearward of the point at which the back support bar 166 extends vertically off of the control panel 160 to a point that is substantially even with the point at which the back support bar 166 extends vertically off of the control panel 160 (relative to the front of the lawn care vehicle 100). In some embodiments, the control levers 164 may include handle portions 168 that bend out of the substantially vertical orientation to a substantially horizontal orientation to facilitate operation and gripping by the operator's hand or hands. In some cases, the handle portions 168 may be bent to correspond to the orientation of the front support bar 162. However, the control levers 164 may be prevented from contacting the front support bar 162 (or the back support bar 166) by a movement preventer that is disposed somewhere along a shaft of the control levers 164. Accordingly, over the full range of motion of the control levers 164, the control levers 164 may not be enabled to contact any portion of the front support bar 162 or the back support bar 166. Furthermore, in some embodiments, the range of motion of the control levers 164 may move the handle portion 168 from a position rearward of the back support bar 166 (i.e., when the control levers 164 are in their furthest rearward position) to a position directly over the position of the back support bar 166 (i.e., while the control levers 164 are being moved forward toward the front support bar 162 and finally to a position that is forward of the back support bar 166, but rearward (and not in contact with) the front support bar 162 (i.e., when the control levers 164 are fully forward).

In some embodiments, the cutting deck assembly 140 may be suspended from a rotatable mounting frame 142. The rotatable mounting frame 142 may include one or more frame members 144 that may extend forward from the front mount assembly 170 at hinge 172. The hinge 172 may enable the rotatable mounting frame 142 (and thus also the cutting deck assembly 140) to be foldable as shown in FIG. 10. Spring 174 may be provided to assist in folding the rotatable mounting frame 142 and the cutting deck assembly 140. By folding the cutting deck assembly 140, the size of the lawn care vehicle 100 may be reduced at least with respect to the amount of ground space covered by the lawn care vehicle 100. This configuration may enable more such vehicles to be fit into a shipping container for more efficient shipment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
   a frame to which a pair of drive wheels of the riding lawn care vehicle are operably coupled;
   an engine operably coupled to the frame and disposed substantially between the drive wheels;
   a steering assembly comprising control levers operably coupled to respective ones of the drive wheels of the riding lawn care vehicle via respective hydrostatic drive pumps driven by the engine, the steering assembly enabling steering of the riding lawn care vehicle based on drive speed control of the drive wheels responsive to positioning of the control levers of the steering assembly;
   a support platform operably coupled to the frame to support a standing rider at a rear of the riding lawn care vehicle; and
   a cutting deck operably coupled to the frame,
   wherein the steering assembly is disposed at an operating station, the operating station being disposed to extend substantially upward relative to a plane in which the frame lies,
   wherein the control levers are disposed substantially between a front support bar and a back support bar, the front support bar having a width that is larger than a width of the back support bar,
   wherein the control levers each have a distal end such that distal ends of the control levers extend toward each other and are spaced apart from each other by a separation distance, and
   wherein the separation distance between the distal ends of the control levers is about equal to the width of the back support bar.

2. The riding lawn care vehicle of claim 1, wherein the front support bar extends transversely, relative to a longitudinal centerline of the riding lawn care vehicle, across a majority portion of a width of the control panel.

3. The riding lawn care vehicle of claim 2, wherein the front support bar comprises at least one forwardly progressing bend along a portion thereof.

4. The riding lawn care vehicle of claim 3, wherein the rear support bar extends transversely, relative to the longitudinal centerline of the riding lawn care vehicle, across a width of the control panel substantially parallel to a direction of extension of the front support bar.

5. The riding lawn care vehicle of claim 4, wherein the rear support bar comprises at least one bend along a portion thereof.

6. The riding lawn care vehicle of claim 5, wherein the at least one bend along the portion of the rear support bar causes corresponding portions of the front support bar and rear support bar to be parallel to each other on respective opposite sides of the at least one bend.

7. The riding lawn care vehicle of claim 3, wherein the control levers comprise handle portions that bend to a substantially horizontal orientation.

8. The riding lawn care vehicle of claim 7, wherein the control levers are further bent to correspond to an orientation of the front support bar.

9. The riding lawn care vehicle of claim 7, wherein the rear support bar extends transversely, relative to the longitudinal centerline of the riding lawn care vehicle, across a width of the control panel substantially parallel to a direction of extension of the front support bar,
   wherein the rear support bar comprises at least one bend along a portion thereof,
   wherein the at least one bend along the portion of the rear support bar causes corresponding portions of the front support bar and rear support bar to be parallel to each other on respective opposite sides of the at least one bend, and wherein the control levers are further bent to correspond to an orientation of the front support bar and rear support bar.

10. The riding lawn care vehicle of claim 1, wherein the operating station is disposed to extend substantially vertically out of the plane in which the frame lies and is disposed substantially above the engine, the operating station further extending forward along at least a portion of the operating station, while all portions of the operating station remain rearward of an axis of rotation of the drive wheels of the riding lawn care vehicle.

11. The riding lawn care vehicle of claim 1, wherein the riding lawn care vehicle is a mower having a substantially zero degree turning radius.

12. A steering assembly for a riding lawn care vehicle operable by a standing operator standing on a support platform at a rear portion of the riding lawn care vehicle, the steering assembly being disposed at an operating station that extends substantially upward relative to a plane in which a frame of the riding lawn care vehicle lies, the steering assembly comprising:
  control levers operably coupled to respective ones of drive wheels of the riding lawn care vehicle via respective hydrostatic drive pumps driven by an engine, the control levers enabling steering of the riding lawn care vehicle based on drive speed control of the drive wheels responsive to positioning of the control levers;
  a front support bar; and
  a back support bar,
  wherein the control levers are disposed substantially between the front support bar and the back support bar, the front support bar having a width that is larger than a width of the back support bar,
  wherein the control levers each have a distal end such that distal ends of the control levers extend toward each other and are spaced apart from each other by a separation distance, and
  wherein the separation distance between the distal ends of the control levers is about equal to the width of the back support bar.

13. The steering assembly of claim 12, wherein the front support bar extends transversely, relative to a longitudinal centerline of the riding lawn care vehicle, across a majority portion of a width of the control panel.

14. The steering assembly of claim 13, wherein the front support bar comprises at least one forwardly progressing bend along a portion thereof.

15. The steering assembly of claim 14, wherein the rear support bar extends transversely, relative to the longitudinal centerline of the riding lawn care vehicle, across a width of the control panel substantially parallel to a direction of extension of the front support bar.

16. The steering assembly of claim 15, wherein the rear support bar comprises at least one bend along a portion thereof.

17. The steering assembly of claim 16, wherein the at least one bend along the portion of the rear support bar causes corresponding portions of the front support bar and rear support bar to be parallel to each other on respective opposite sides of the at least one bend.

18. The steering assembly of claim 14, wherein the control levers comprise handle portions that bend to a substantially horizontal orientation, and
  wherein the control levers are further bent to correspond to an orientation of the front support bar.

19. The steering assembly of claim 12, wherein the riding lawn care vehicle is a mower having a substantially zero degree turning radius.

20. A riding lawn care vehicle comprising:
  a frame to which a pair of drive wheels of the riding lawn care vehicle are operably coupled;
  an engine operably coupled to the frame and disposed substantially between the drive wheels;
  a steering assembly comprising control levers operably coupled to respective ones of the drive wheels of the riding lawn care vehicle via respective hydrostatic drive pumps driven by the engine, the steering assembly enabling steering of the riding lawn care vehicle based on drive speed control of the drive wheels responsive to positioning of the control levers of the steering assembly;
  a support platform operably coupled to the frame to support a standing rider at a rear of the riding lawn care vehicle; and
  a cutting deck operably coupled to the frame,
  wherein the steering assembly is disposed at an operating station, the operating station being disposed to extend substantially upward relative to a plane in which the frame lies, and
  wherein the operating station is disposed to extend substantially vertically out of the plane in which the frame lies and is disposed substantially above the engine such that an air intake of the engine is disposed substantially below the control levers of the operating station, the operating station further extending forward along at least a portion of the operating station, while all portions of the operating station remain rearward of an axis of rotation of the drive wheels of the riding lawn care vehicle,
  wherein the control levers each have a distal end such that distal ends of the control levers extend toward each other and are spaced apart from each other by a separation distance, and
  wherein the separation distance between the distal ends of the control levers is about equal to the width of the back support bar.

* * * * *